(12) United States Patent
Smith

(10) Patent No.: US 9,033,326 B1
(45) Date of Patent: May 19, 2015

(54) INTERLOCKING AND REMOVABLE GRID SYSTEM FOR FLORAL ARRANGING

(71) Applicant: Adam Richard Smith, Portland, OR (US)

(72) Inventor: Adam Richard Smith, Portland, OR (US)

( * ) Notice: Subject to any disclaimer, the term of this patent is extended or adjusted under 35 U.S.C. 154(b) by 0 days.

(21) Appl. No.: 14/587,470

(22) Filed: Dec. 31, 2014

(51) Int. Cl.
  *B25B 11/02* (2006.01)
  *A01G 5/00* (2006.01)
(52) U.S. Cl.
  CPC .......................................... *A01G 5/00* (2013.01)
(58) Field of Classification Search
  CPC ........ B25B 5/082; B25B 27/00; B25B 28/00; B23P 19/04; B23P 19/10
  USPC ................. 269/40, 6, 3, 95, 143, 249, 71, 75; 29/244, 255, 270, 278, 271
  See application file for complete search history.

(56) References Cited

U.S. PATENT DOCUMENTS

| | | | | |
|---|---|---|---|---|
| 1,396,162 | A * | 11/1921 | Campbell et al. | 269/37 |
| 3,680,193 | A * | 8/1972 | Scaminaci et al. | 29/271 |
| 4,730,386 | A * | 3/1988 | Fieberg et al. | 29/758 |
| 5,921,252 | A * | 7/1999 | Chubb | 132/144 |
| 2003/0209210 | A1 * | 11/2003 | Plante et al. | 119/625 |

* cited by examiner

*Primary Examiner* — Lee D Wilson

(57) ABSTRACT

An interlocking and removable tool for floral arranging, consisting of two interlocking pieces which form a sturdy grid when assembled. This grid is placed on top of a vase, jar, bowl, or other vessel used for housing arranged flowers. This grid keeps flowers in place while being arranged, without falling over, and allows the user to construct floral arrangements with ease. When the desired arrangement is complete, the interlocking components slide apart and are removed without disrupting the floral arrangement.

5 Claims, 6 Drawing Sheets

INTERLOCKING AND REMOVABLE GRID SYSTEM FOR FLORAL ARRANGING

CROSS-REFERENCE TO RELATED APPLICATIONS

Provisional application No. 61/924,204 filed on Jan. 6, 2014.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention is in the technical field of housewares.

More particularly, the present invention is in the technical field of arts, crafts, and home décor.

SUMMARY OF THE INVENTION

The present invention is a tool for arranging flowers. It consists of two identical interlocking pieces, which form a sturdy grid when assembled. This grid is placed on top of a vase, jar, bowl, or other vessel used for housing flowers. The user of this tool can then place flowers individually or in small batches into the compartmental squares of the grid. This grid keeps flowers in place while being sorted, processed, and/or arranged, without falling over, and allows the user to construct floral arrangements with ease. When the desired arrangement is complete, the interlocking components slide apart and are removed without disrupting the floral arrangement. The user can grasp the pull tabs of each individual grid piece, and simply pulls the grid pieces away from the vase, leaving a fully constructed floral arrangement.

The advantages of the present invention include, without limitation, that it allows a user to easily arrange flowers utilizing an interlocking and removable grid system. The functional design allows the present invention to operate effectively and ergonomically. Further, the device allows users to create complex and ornate floral arrangements.

The interlocking and removable grid system for floral arranging can be accompanied with written, illustrative, or photographic instructions for specific floral designs. The instructional placement of particular flowers corresponds with the individual squares within the grid system, which can be numbered, color coded, or identified uniquely in a variety of means. Further, instructions can be printed directly onto the interlocking and removable grid system for floral arranging.

Additionally, the advantages of the present invention include the ability to fully remove the interlocking and removable grid system once the floral arrangement is complete, unlike the use of floral foam, floral frogs, or wire floral tools that are places over the opening of floral arrangement vessels, all of which remain visible after flowers have been arranged.

In broad embodiment, the present invention is an interlocking and removable tool for arranging flowers.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

DETAILED DESCRIPTION OF THE INVENTION

Figure 1:
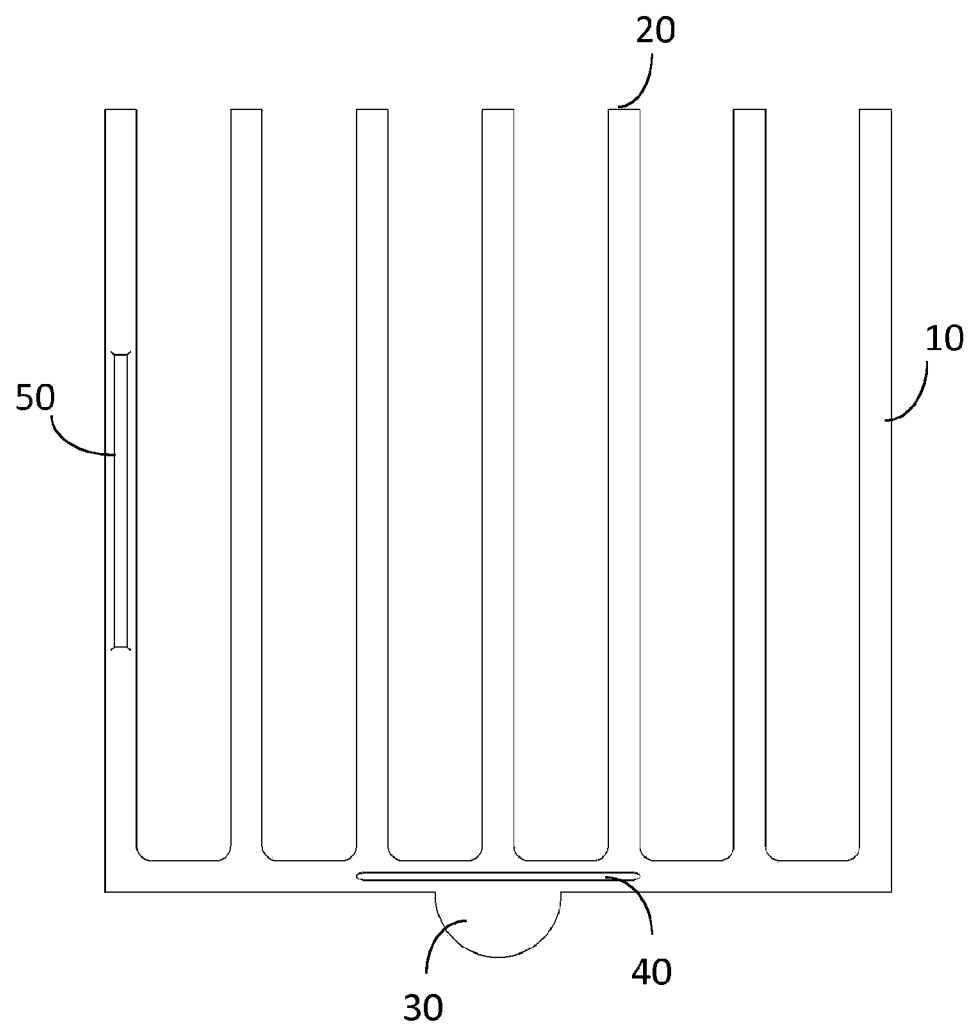
FIG. 1 is a top view of one single component of the interlocking and removable grid system for floral arranging of the present invention.

Referring now to the invention in more detail, in FIG. 1 there is shown a top view of one single component of the interlocking and removable grid system for floral arranging.

Referring now in even greater detail to the invention shown in FIG. 1, there is shown a three sided outer frame having a substantially square shape (10), a plurality of internal tines (20), a pull tab (30), an elevated catch (40), and a slot opening (50).

The construction details of the invention as shown in FIG. 1 are that the interlocking and removable grid system for floral arranging may be made of plastic, wood, metal, glass or any other sufficiently rigid and safe material.

Figure 2:
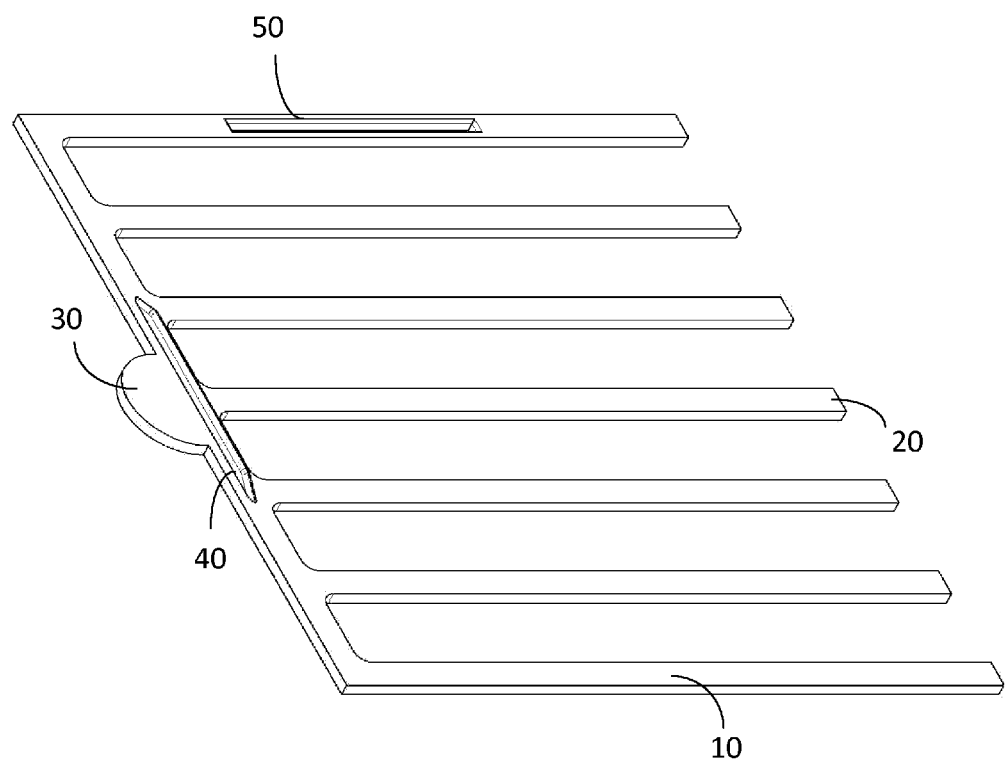
FIG. 2 is a left side isometric view of one single component of the interlocking and removable grid system for floral arranging of the present invention.

Referring now to the invention in more detail, in FIG. 2 there is shown a top left isometric view of one single component of the interlocking and removable grid system for floral arranging.

Referring now in even greater detail to the invention shown in FIG. 2, there is shown another view of the three sided outer frame having a substantially square shape (10), a plurality of internal tines (20), a pull tab (30), an elevated catch (40), and a slot opening (50).

Figure 3:
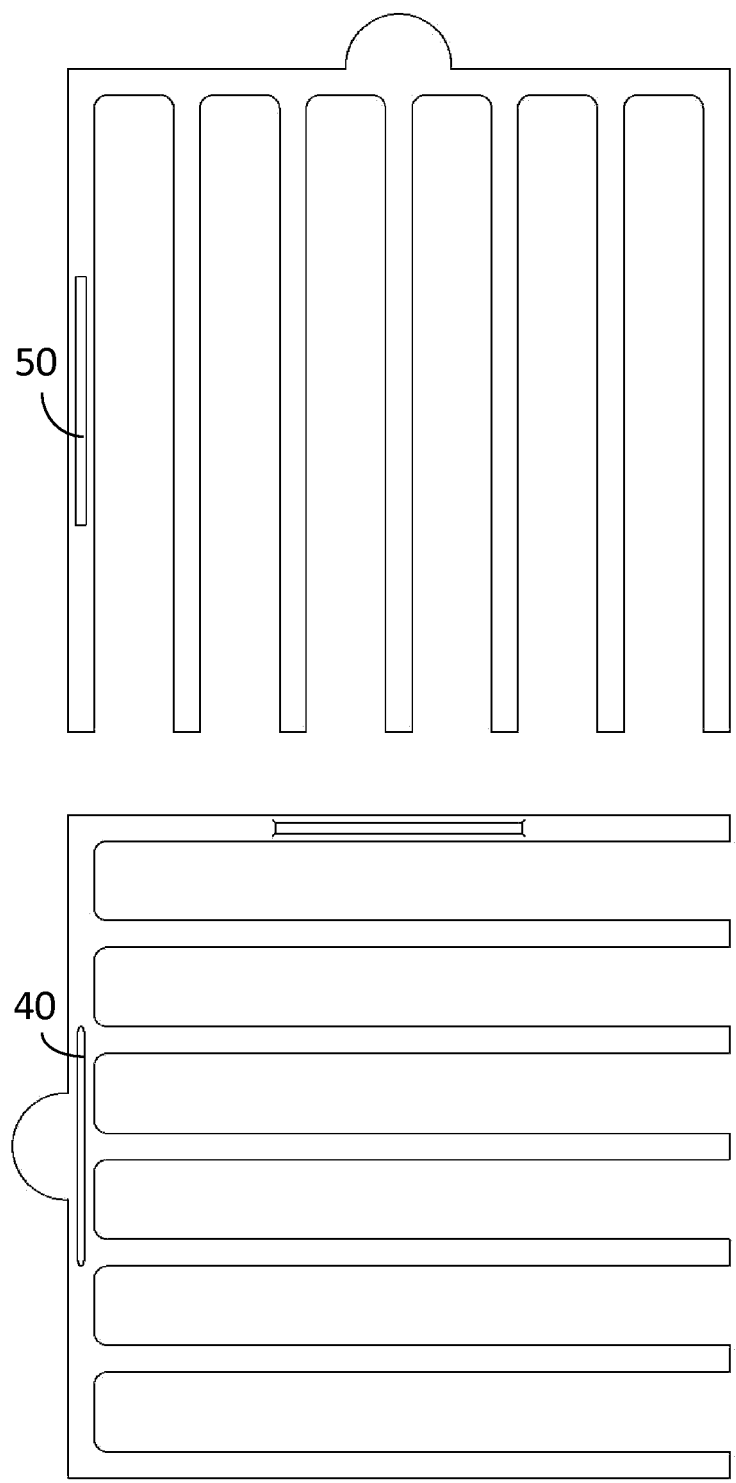
FIG. 3 is a top view of two components of the interlocking and removable grid system for floral arranging of the present invention.

Referring now to the invention in more detail, in FIG. 3 there is shown a top view of two components of the interlocking and removable grid system.

Still referring in more detail, in FIG. 3, is shown the ability to assemble and disassemble the interlocking and removable grid system for floral arranging by sliding one component into the other, by inverting one piece of the grid and rotating it ninety degrees to the right, aligning the elevated catch (40) and slot opening (50).

Figure 4:
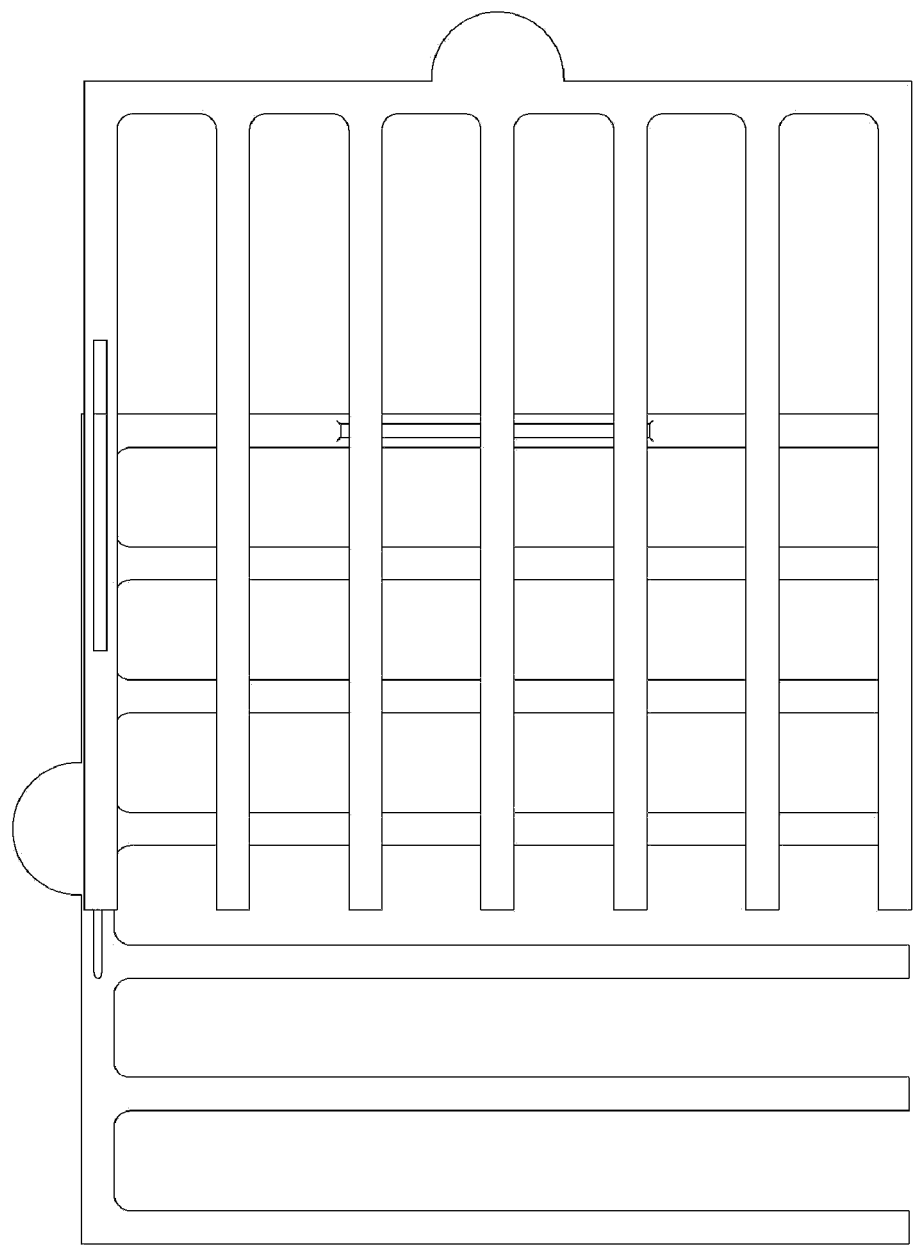
FIG. 4 is a top view of the partially assembled interlocking and removable grid system for floral arranging of the present invention.

Referring now to the invention in more detail, in FIG. 4 there is shown a partially assembled interlocking and removable grid system.

Still referring in more detail, in FIG. 4, is shown in even greater detail the ability to assemble and disassemble the interlocking and removable grid system for floral arranging by sliding one component into the other, by aligning the elevated catch (40) and slot opening (50) in both components.

Figure 5:
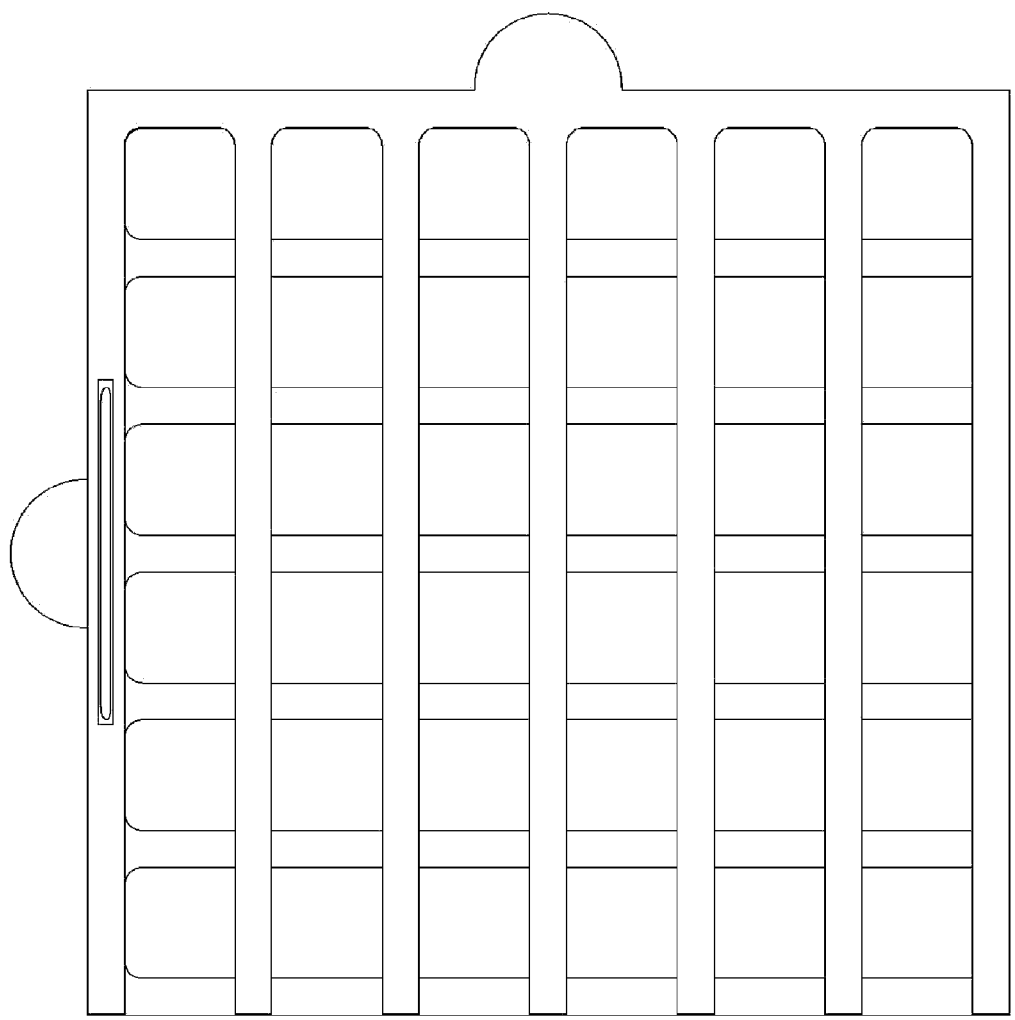
FIG. 5 is a top view of the fully assembled interlocking and removable grid system for floral arranging of the present invention.

Referring now to the invention in more detail, in FIG. 5 there is shown a top view of the fully assembled interlocking and removable grid system for floral arranging. This device consists of two identical components designed for removal once a floral arrangement is complete.

In further detail, still referring to the invention in FIG. 5, the device is shown to assemble as a stable grid system, with a series of small square openings. In even greater detail featured in FIG. 5, the two identical components are shown to be independent units which assemble into one interlocking and removable grid system for floral arranging.

Figure 6:
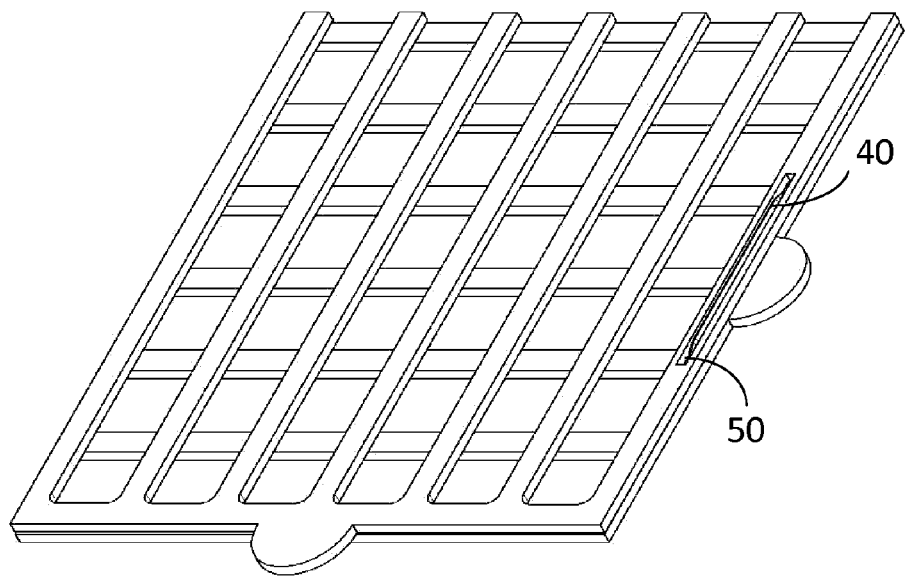
FIG. 6 is a right isometric view of the fully assembled interlocking and removable grid system for floral arranging of the present invention.

Referring now to the invention shown in FIG. 6, there is shown a right isometric view of the fully assembled interlocking and removable grid system for floral arranging. This device consists of two identical components designed for removal once a floral arrangement is complete.

Still referring to FIG. 6, is shown in even greater detail the ability to assemble and disassemble the interlocking and removable grid system for floral arranging by sliding one component into the other, by fully aligning the elevated catch (40) and slot opening (50) in both components to form a stable grid that is removable and reusable.

The embodiments of the invention in which an exclusive property or privilege is claimed are defined as follows:

1. An interlocking and removable grid system for floral arranging, comprising: a three sided outer frame having a substantially square shape, a plurality of internal tines, a pull tab, an elevated catch, and a slot opening, wherein the elevated catch and slot opening form an interlocking mechanism when two grid pieces are assembled.

2. The interlocking and removable grid system for floral arranging of claim 1, wherein the three sided outer frame having a substantially square shape comprises a pull tab.

3. The interlocking and removable grid system for floral arranging of claim 1, wherein the plurality of tines extend outwardly, perpendicular to the pull tab.

4. The interlocking and removable grid system for floral arranging of claim 1, wherein the three sided outer frame having a substantially square shape comprises an elevated catch with placement adjacent to a pull tab.

5. The interlocking and removable grid system for floral arranging of claim 1, wherein the three sided outer frame having a substantially square shape comprises a slot opening with placement center in the left most tine of the outer frame.

\* \* \* \* \*